(12) United States Patent
Jurkiewicz et al.

(10) Patent No.: US 9,122,848 B2
(45) Date of Patent: Sep. 1, 2015

(54) AUTHENTICATION OF USER INTERFACE ELEMENTS IN A WEB 2.0 ENVIRONMENT

(75) Inventors: Jared P. Jurkiewicz, Durham, NC (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1599 days.

(21) Appl. No.: 12/141,115

(22) Filed: Jun. 18, 2008

(65) Prior Publication Data

US 2009/0320105 A1    Dec. 24, 2009

(51) Int. Cl.
*H04L 29/06*    (2006.01)
*G06F 21/31*    (2013.01)
*H04L 29/08*    (2006.01)

(52) U.S. Cl.
CPC ............... *G06F 21/31* (2013.01); *H04L 63/08* (2013.01); *H04L 67/02* (2013.01)

(58) Field of Classification Search
USPC ............................................................ 726/5
See application file for complete search history.

(56) References Cited

U.S. PATENT DOCUMENTS

2006/0185021 A1*  8/2006  Dujari et al. ................... 726/27

OTHER PUBLICATIONS

W3C, "HTML 4.01 Specification", Dec. 24, 1999, W3C, pp. 1-389.*
W3C, "The Original HTTP as defined in 1991", 1991, W3C, HTTP 0.9, pp. 1-2.*

* cited by examiner

*Primary Examiner* — Joseph P Hirl
*Assistant Examiner* — Chi Nguy
(74) *Attorney, Agent, or Firm* — Steven M. Greenberg, Esq.; CRGO Law

(57) ABSTRACT

A method for managing authentication of user interface elements in a user interface can be provided. The method can include displaying a plurality of widgets in the web browser and sending an HTTP request for data to a web site, wherein the HTTP request is sent via an XMLHttpRequest API. The method can further include receiving from the web site a 401 HTTP status code associated with a custom "WWW-Authenticate" header value indicating that the HTTP request is unauthorized for communication with the web site and detecting the custom "WWW-Authenticate" header value. The method can further include displaying in a first widget of the plurality of widgets a text field for entering user credentials. The method can further include sending to the web site an HTTP request including the user credentials entered by a user, wherein the HTTP request is sent via the XMLHttpRequest API.

12 Claims, 3 Drawing Sheets

AUTHENTICATION OF USER INTERFACE ELEMENTS IN A WEB 2.0 ENVIRONMENT

BACKGROUND OF THE INVENTION

1. Field of the Invention

The present invention relates to the field of user interfaces and more particularly to software that facilitates authentication of user interface elements in a Web 2.0 environment.

2. Description of the Related Art

Web 2.0 is a term describing a trend in the use of World Wide Web technology and web design that aims to facilitates creativity, information sharing, and collaboration among users. These concepts have led to the development and evolution of various service providers, such as web-based communities and hosted services, including social-networking sites, wikis, and blogs. Although the term suggests a new version of the World Wide Web, it does not refer to an update to any technical specifications, but to changes in the ways software developers and end-users use the Web. In short, the Web 2.0 refers to the trend wherein the web is used as a platform for technologies.

Web 2.0 websites allow users to run software-applications entirely through a browser. This is due to the fact that a Web 2.0 web site interface is based on Ajax, Flex or similar rich media. Ajax (asynchronous JavaScript and XML) is a group of inter-related web development techniques used for creating interactive web applications. JavaScript is the scripting language in which Ajax function calls are usually made. Flex is a collection of technologies for the development and deployment of cross platform, rich Internet applications based on the proprietary Flash platform.

One application of the Web 2.0 concept includes dashboard applications. Individuals are sometimes faced with the task of monitoring certain information feeds such as stock values, weather reports, news headlines or the status of one or more computers. In an effort to facilitate the administration of such information feeds, dashboard-like user interfaces are often built using Web 2.0. A dashboard is a user interface that is designed to provide visual presentations of information feeds. A dashboard may obtain information from the local operating system in a computer, from one or more remote applications that may be running, and/or from one or more remote sites on a network, and present it all on one interface.

Another application of the Web 2.0 concept includes the use of mashups. A mashup is a web application that combines data from more than one source into a single integrated tool. Content used in mashups is typically sourced from a third party and integrated into the client web browser or the user interface of the mashup. Mashups and dashboards, however, don't come without their drawbacks.

Individual user interface elements of a mashup or a dashboard application sometimes require authentication. For example, a user's browser may comprise multiple user interface elements wherein a first user interface element consists of a stock ticker that receives information from a for-pay or subscription-based web site data source that requires a login or authentication. Thus, when a user first initiates the mashup or dashboard, a separate login window may be spawned or instantiated so that the user may enter his user name and password and commence the stock ticker user interface element. Once authenticated, the stock ticker user interface element continuously receives and displays stock information in its apportioned area of the web browser.

If, however, the web browser or user interface element becomes disconnected from the web site data source or simply times out, then upon reconnecting the web site data source may again require authentication. This results in the same authentication window popping up so that the user may enter his user name and password. If more than one user interface element in the web browser requires authentication, then multiple separate login windows will automatically pop up. This can be annoying and distracting to the user. Further, with computer desktop space at a premium, the sudden automatic spawning of multiple windows on a user's desktop can lower productivity and cause delays. The user is forced to deal with such a situation by stopping what he's doing to either log into each authentication window or simply shut them down. This can be tedious and time-consuming.

Therefore, there is a need to overcome the deficiencies with the prior art and more particularly for a more efficient way to manage authentication of user interface elements in a Web 2.0 environment.

BRIEF SUMMARY OF THE INVENTION

Embodiments of the present invention address deficiencies of the art in respect to user interfaces and provide a novel and non-obvious method, system and computer program product for facilitating authentication of user interface elements in a minimal and non-intrusive manner. In an embodiment of the invention, a method for managing authentication of user interface elements in a user interface can be provided. The method can include displaying a plurality of widgets in the web browser and sending an HTTP request for data to a web site, wherein the HTTP request is sent via an XMLHttpRequest API. The method can further include receiving from the web site a 401 HTTP status code associated with a custom "WWW-Authenticate" header value indicating that the HTTP request is unauthorized for communication with the web site and detecting the custom "WWW-Authenticate" header value. The method can further include displaying in a first widget of the plurality of widgets a text field for entering user credentials. The method can further include sending to the web site an HTTP request including the user credentials entered by a user, wherein the HTTP request is sent via the XMLHttpRequest API.

In another embodiment of the invention, a computer program product comprising a computer usable medium embodying computer usable program code for managing authentication of user interface elements in a user interface can be provided. The computer program product can include computer usable program code for displaying a plurality of widgets in the web browser and sending an HTTP request for data to a web site, wherein the HTTP request is sent via an XMLHttpRequest API. The computer program product can further include computer usable program code for receiving from the web site a 401 HTTP status code associated with a custom "WWW-Authenticate" header value indicating that the HTTP request is unauthorized for communication with the web site and detecting the custom "WWW-Authenticate" header value. The computer program product can further include computer usable program code for displaying in a first widget of the plurality of widgets a text field for entering user credentials. The computer program product can further include computer usable program code for sending to the web site an HTTP request including the user credentials entered by a user, wherein the HTTP request is sent via the XMLHttpRequest API.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to user interfaces and provide a novel and non-obvious method, system and computer program product for facilitating authentication of a user interface elements in a minimal and non-intrusive manner. In an embodiment of the invention, a method for managing authentication of user interface elements in a user interface can be provided. The method can include displaying a plurality of widgets in the web browser and sending an HTTP request for data to a web site, wherein the HTTP request is sent via an XMLHttpRequest API. The method can further include receiving from the web site a 401 HTTP status code associated with a custom "WWW-Authenticate" header value indicating that the HTTP request is unauthorized for communication with the web site and detecting the custom "WWW-Authenticate" header value. The method can further include displaying in a first widget of the plurality of widgets a text field for entering user credentials and reading user credentials input by a user into the first widget. The method can further include sending to the web site an HTTP request including the user credentials, wherein the HTTP request is sent via the XMLHttpRequest API.

Figure 1:
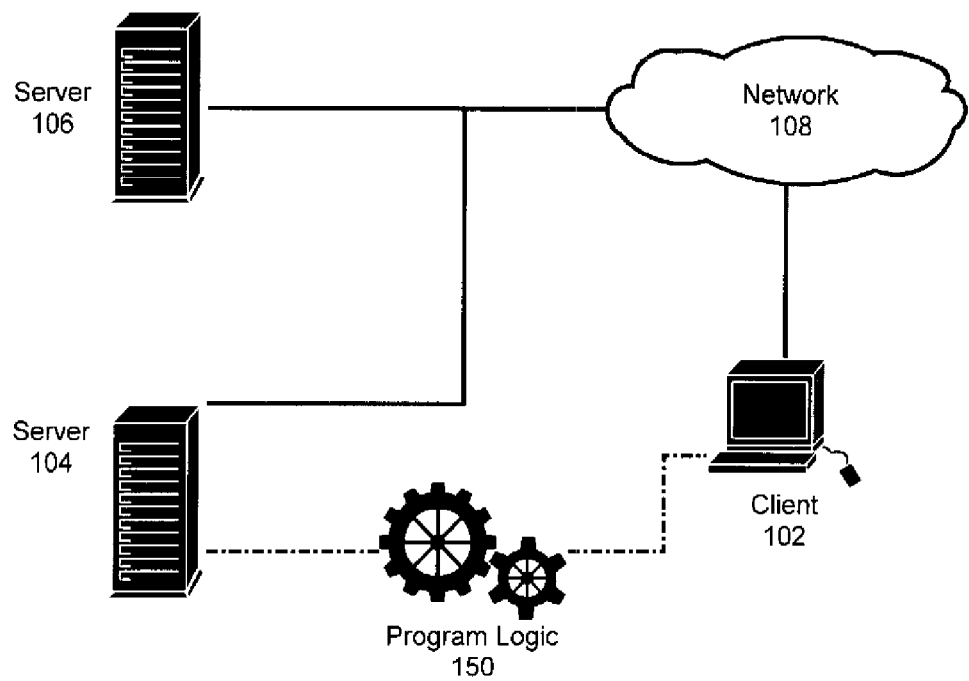
FIG. 1 is a block diagram illustrating a network architecture of a system for managing authentication of user interface elements in a user interface, in accordance with one embodiment of the present invention.

Referring now to the drawing figures in which like reference designators refer to like elements, there is shown in FIG. 1 a block diagram illustrating a network architecture of a system for managing authentication of user interface elements in a user interface, in accordance with one embodiment of the present invention. The exemplary embodiments of the present invention adhere to the system architecture of FIG. 1. FIG. 1 shows an embodiment of the present invention wherein a client user 102 may interact with servers 104-106 over a network 108, such as the Internet, the World Wide Web, a WAN or a LAN.

FIG. 1 shows client user 102 and servers 104-106 connected to network 108 via computers, such as desktop personal computers, workstations or servers. Servers 104, 106 include software engines that deliver data and/or user interface component functionality to client computer 102. The servers 104-106 may adhere to any commercially available server platform, such as the Sun Microsystems J2EE platform, a Web-based application platform, an integrated platform for e-commerce or a content management system platform. It should be noted that although FIG. 1 shows only one client user 102 and two servers 104-106, the system of the present invention supports any number of client users and servers connected via network 108.

FIG. 1 shows a system whereby a client application, represented by program logic 150, running on a client 102 automatically renders user interface elements in a user interface such as a web browser. The user interface elements include information received from servers 104-106. Program logic 150 comprises computer source code, scripting language code or interpreted language code that is compiled to produce computer instructions that perform various functions of the present invention. In one embodiment of the present invention, the program logic 150 is a scripting language such as XML, XSLT, Javascript, ECMAScript, Cascading style sheets, XUL, PHP or a related AJAX or JSP technology.

As explained above, program logic 150 may reside on a client 102, or a server (such as server 104) or any combination of the two. In one embodiment of the present invention, the program logic 150 is a client-server application having a client portion that resides on the computer of client user 102 and a server application that resides on a server, such as servers 104-106.

In an embodiment of the present invention, the computer systems of client user 102 and servers 104-106 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of client user 102 and servers 104-106 are a server system, such as IBM RS/6000 workstations and servers running the AIX operating system.

In an embodiment of the present invention, the network 108 is a circuit switched network, such as the Public Service Telephone Network (PSTN). In another embodiment, the network 108 is a packet switched network. The packet switched network is a wide area network (WAN), such as the global Internet, a private WAN, a local area network (LAN), a telecommunications network or any combination of the above-mentioned networks. In yet another embodiment, the structure of the network 108 is a wired network, a wireless network, a broadcast network or a point-to-point network.

Figure 2:
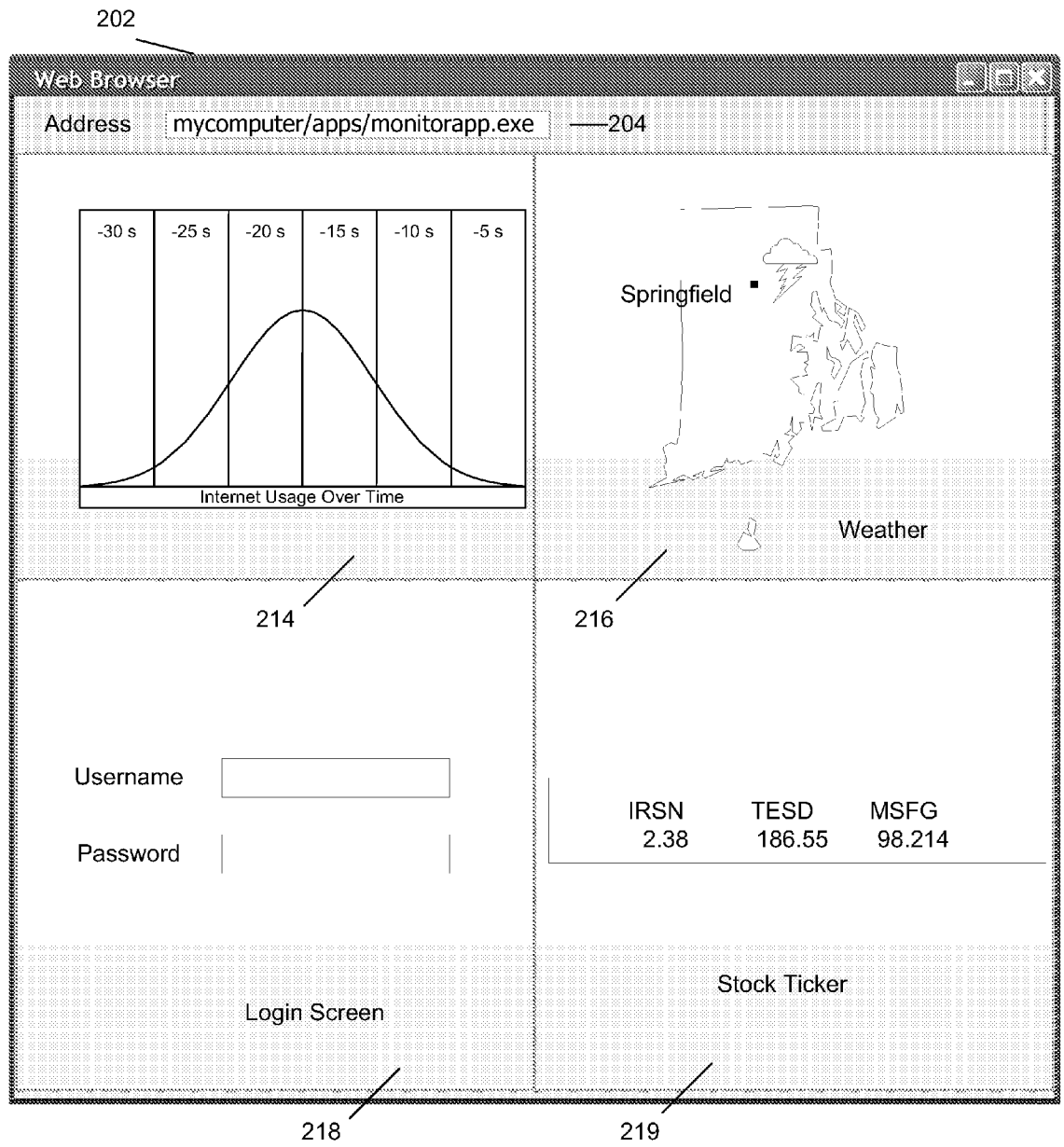
FIG. 2 is an illustration of a user interface including multiple user interface elements, in accordance with one embodiment of the present invention.

FIG. 2 is an illustration of a user interface 202 including multiple user interface elements 214, 216, 218, 219, in accordance with one embodiment of the present invention. It should be noted that although FIG. 2 depicts one example wherein a user interface (specifically, a web browser) is used to monitor internet usage, weather, voting results and stock values, the present invention may be directed towards the monitoring of any type of data feed. The user interface 202 corresponds to a dashboard or mashup including multiple user interface elements, as described above. User interface elements, or widgets, refer to any element of a graphical user interface that displays and manipulates information, such as a window, a text box, a text field, a button, a drop down menu and a slider bar.

FIG. 2 shows that the user interface 202 is a conventional web browser. FIG. 2 shows that the web browser 202 includes an address text field 204 that indicates a local location of an executable file on client 102 that automatically renders widgets. User interface 202 thereby executes the executable file, which produces the graphics displayed in user interface 202, as shown in FIG. 2.

In another embodiment of the present invention, address text field 204 may indicate a Universal Resource Locator (URL) of a web site. Upon entering the appropriate URL, the web browser 202 sends a HyperText Transfer Protocol (HTTP) request for data to the appropriate web server, such as web server 106, corresponding to said URL. Subsequently, the web server 106 sends executable data to the web browser 202. The executable data received by the web browser 202 may be HTML or may comprise some or all of the program logic 150, which may be a scripting language such as XML, XSLT, Javascript, etc. Upon receiving the executable data sent by web server 106, web browser 202 executes the executable data, which produces the graphics displayed in user interface 202, as shown in FIG. 2.

As explained above, FIG. 2 shows user interface 202 including multiple user interface elements, or quadrants, 214, 216, 218, 219, which depict various types of information received from various network servers, or web sites, such as servers 104-106, which may be, for example, network servers available over a LAN or web sites served by web servers available over the Internet. Each user interface element 214, 216, 218, 219 gathers data from corresponding network servers by sending an HTTP request to the appropriate network server via an XMLHttpRequest API. The XMLHttpRequest API can be used by JavaScript and other web browser scripting languages to transfer XML and other text data between a web page's client-side and its corresponding server-side. The XMLHttpRequest API can operate in both synchronous and asynchronous manners.

User interface element 214 includes a graph that shows usage of the Internet or the World Wide Web over time. User interface element 216 includes a map showing the weather for a particular location. User interface element 218 includes a pair of text fields for entering user credentials to be authenticated for authorized access to a server. User interface element 219 includes a dynamic stock ticker that shows current stock values for a particular stock exchange.

Figure 3:
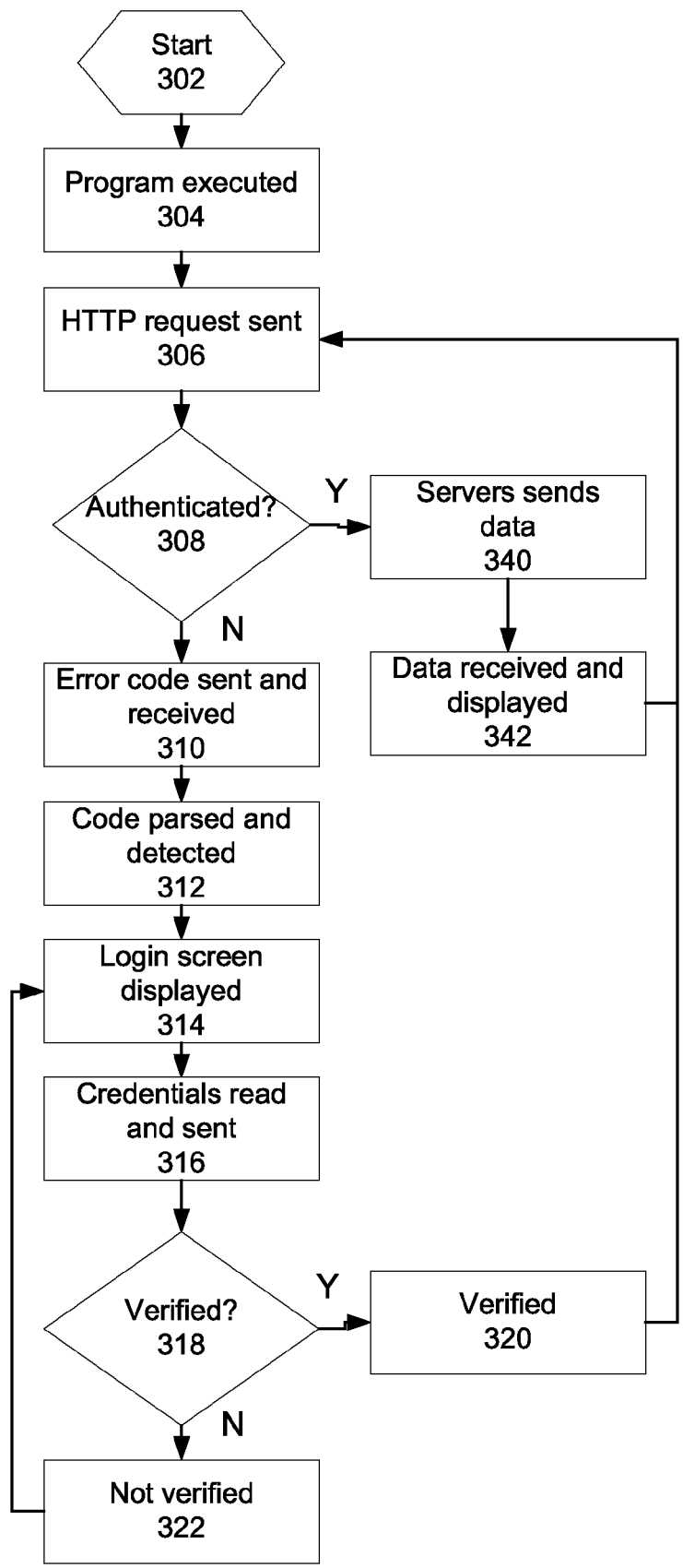
FIG. 3 is a flow chart showing the control flow of a process for automatically managing authentication of user interface elements in a user interface, in accordance with one embodiment of the present invention.

FIG. 3 is a flow chart showing the control flow of a process for automatically managing authentication of user interface elements in a user interface, in accordance with one embodiment of the present invention. FIG. 3 depicts the process executed by program logic 150 residing on a client computer such as client 102. Specifically, FIG. 3 depicts the process by which a single user interface element or widget is rendered in the user interface 202. The client application may be a web browser, such as web browser 202, executing program logic 150. The flow chart of FIG. 3 begins with step 302 and moves directly to step 304.

In step 304, the program logic 150 is executed so as to display a user interface element, or quadrant, such as user interface element 219 in the user interface, or web browser, 202. In step 306, the web browser 202 sends an HTTP request for stock ticker data to a web site, such as web server 104. The HTTP request may be sent via an XMLHttpRequest API. In step 308, the web server 104 receives the HTTP request and determines whether the user of interface element 219 is already authenticated. If the user of interface element 219 is already authenticated, then control flows to step 340. If not, then control flows to step 310.

In step 340, the server 104 sends the requested stock ticker data to the web browser 202 via an HTTP message. In step 342, the web browser 202 receives the stock ticker data and program logic 150 proceeds to display the stock ticker data in the user interface element 219. Also in step 342, the program logic 150 waits a period of time before control flows back to step 306.

In step 310, the server 104 sends to the web browser 202 a message including a 401 HTTP status code having a custom "WWW-Authenticate" header value indicating that the HTTP request is unauthorized for communication with the server 104. A custom header value is a non-standard header value that is not found in the specification for HTML. A custom header value is a unique value created for the purpose recognizing when a client side routine must implement the process of the present invention. One example of a custom "WWW-Authenticate" header value includes the "SSOAuth realm='Secure Area'" header value. The message sent to the web browser 202 may be a form based login that redirects the user to a login page or a basic or digest authentication that presents a login dialog box to the user. Also in step 310, the web browser 202 receives the 401 HTTP status code including the custom "WWW-Authenticate" header value. In step 312, the program logic 150 parses the HTTP status code and detects the custom "WWW-Authenticate" header value.

In one embodiment of the present invention, a client side program, such as Dojo, is used to receive and process the received 401 HTTP status code including the custom "WWW-Authenticate" header value. Dojo is a modular open source JavaScript library designed to aid in development of JavaScript-based or Ajax-based applications and web sites. Dojo widgets are prepackaged components of JavaScript code, HTML markup and CSS style declarations.

In step 314, the program logic 150 displays in user interface element 219 at least one text field for entering user credentials, such as depicted with reference to user interface element 218. The user proceeds to enter user credentials into the at least one text field provided in user interface element 219. Alternative to step 314, the program logic 150 displays a separate login window or login interface that presents the user with at least one text field for entering user credentials. In step 316, program logic 150 reads the user credentials that were entered and web browser 202 sends them via HTTP request to the server 104, wherein the HTTP request is sent via the XMLHttpRequest API.

In step 318, the server 104 receives the user credentials and determines whether the credentials are verified. If the credentials are verified, then control flows to step 322. If not, then control flows to step 322 wherein server 104 sends an HTTP message to the web browser 202 indicating that the provided credentials have not been verified and control flows back to step 314. In step 320, the server 104 sends an HTTP message to the web browser 202 indicating that the provided credentials are verified and control flows back to step 306.

As explained above, the present invention is advantageous since it allows for the presentation of a login form within an already-existing user interface element, thereby eliminating the need for an additional dialog box to be displayed and cluttering the user's desktop. The present invention is further advantageous as it allows a user to determine exactly which user interface element or elements are in need of authentications since the login form is presented in the very user interface elements that requires authentication. Additionally, the present invention allows for automatic, periodic updating of information that is displayed in authenticated user interface elements that are rendered in the user interface.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for managing authentication for widgets in a web browser, comprising:
   displaying a plurality of widgets in the web browser;
   sending a hypertext transfer protocol (HTTP) request for data to a web site, wherein the HTTP request is sent via an XMLHttpRequest API;
   receiving from the web site a 401 HTTP status code not present in the HTTP specification and associated with a custom "WWW-Authenticate" header value indicating that the HTTP request is unauthorized for communication with the web site;
   detecting the custom "WWW-Authenticate" header value; and
   displaying in a first widget of the plurality of widgets a text field for entering user credentials.

2. The method of claim 1, further comprising:
   reading user credentials input by a user into the first widget; and
   sending to the web site an HTTP request including the user credentials, wherein the HTTP request is sent via the XMLHttpRequest API.

3. The method of claim 2, further comprising:
   sending an HTTP request for data to the web site, wherein the HTTP request is sent via an XMLHttpRequest API;
   receiving from the web site an HTTP message including the data requested; and
   displaying in the first widget the data requested.

4. The method of claim 3, wherein the step of displaying a plurality of widgets comprises:
   displaying a plurality of widgets in the web browser, wherein each widget comprises an area of the web browser on which data is displayed.

5. The method of claim 4, wherein the step of detecting comprises:
   parsing the 401 HTTP status code; and
   detecting the custom "WWW-Authenticate" header value associated with the 401 HTTP status code.

6. The method of claim 5, wherein the step of displaying comprises:
   displaying in a first widget of the plurality of widgets one text field for entering a user name and one text field for entering a password.

7. A computer program product comprising a computer usable storage medium comprising a storage device storing computer usable program code for managing authentication for widgets in a web browser, the computer program product comprising:
   computer usable program code for displaying a plurality of widgets in the web browser;
   computer usable program code for sending a hypertext transfer protocol (HTTP) request for data to a web site, wherein the HTTP request is sent via an XMLHttpRequest API;
   computer usable program code for receiving from the web site a 401 HTTP status code not present in the HTTP specification and associated with a custom "WWW-Authenticate" header value indicating that the HTTP request is unauthorized for communication with the web site;
   computer usable program code for detecting the custom "WWW-Authenticate" header value; and
   computer usable program code for displaying in a first widget of the plurality of widgets a text field for entering user credentials.

8. The computer program product of claim 7, further comprising:
   computer usable program code for reading user credentials input by a user into the first widget; and
   computer usable program code for sending to the web site an HTTP request including the user credentials, wherein the HTTP request is sent via the XMLHttpRequest API.

9. The computer program product of claim 8, further comprising:
   computer usable program code for sending an HTTP request for data to the web site, wherein the HTTP request is sent via an XMLHttpRequest API;
   computer usable program code for receiving from the web site an HTTP message including the data requested; and
   computer usable program code for displaying in the first widget the data requested.

10. The computer program product of claim 9, wherein the computer usable program code for displaying a plurality of widgets comprises:
    computer usable program code for displaying a plurality of widgets in the web browser, wherein each widget comprises an area of the web browser on which data is displayed.

11. The computer program product of claim 10, wherein the computer usable program code for detecting comprises:
    computer usable program code for parsing the 401 HTTP status code; and
    computer usable program code for detecting the custom "WWW-Authenticate" header value associated with the 401 HTTP status code.

12. The computer program product of claim 11, wherein the computer usable program code for displaying comprises:

computer usable program code for displaying in a first widget of the plurality of widgets one text field for entering a user name and one text field for entering a password.

* * * * *